United States Patent [19]

Chanu et al.

[11] Patent Number: 5,659,595

[45] Date of Patent: Aug. 19, 1997

[54] SELF-DISABLING DEVICE FOR A MOBILE TELEPHONE TYPE PORTABLE TERMINAL

[75] Inventors: Frédéric Chanu, Montesson; Christophe Jouin, Paris, both of France

[73] Assignee: Alcatel Mobile Communication France, Paris, France

[21] Appl. No.: 407,086

[22] Filed: Mar. 20, 1995

[30] Foreign Application Priority Data

Mar. 29, 1994 [FR] France ................................ 94 03691

[51] Int. Cl.⁶ .............................. H04Q 7/20; H04Q 7/32
[52] U.S. Cl. ......................... 455/411; 455/565; 380/23
[58] Field of Search ........................ 379/58, 59, 60, 379/62, 63, 61; 455/33.2, 33.1; 380/23

[56] References Cited

FOREIGN PATENT DOCUMENTS

0135783A3  4/1985  European Pat. Off. .
0562890A1  9/1993  European Pat. Off. .

OTHER PUBLICATIONS

ITG–Fachbericht 124, Sep. 1993, NEU–ULM, GE, pp. 517–526; Heinz et al. "Der Short Message Service –ein neuer dienst der digitalen Mobilkommunikation".

*Primary Examiner*—Dwayne Bost
*Assistant Examiner*—Nay Maung
*Attorney, Agent, or Firm*—Sughrue, Mion, Zinn, Macpeak & Seas

[57] ABSTRACT

A self-disabling device for a portable terminal used in a mobile telephone network includes a register holding an identification number of the portable terminal and a buffer memory for temporarily storing short information messages transmitted by a control station of the network. One message contains a list of identifier numbers of terminals used fraudulently. A comparator compares the identifier number of the terminal with each of the identifier numbers in the list and transmission of calls by the portable terminal is disabled in response to a positive comparison by the comparator.

10 Claims, 2 Drawing Sheets

SELF-DISABLING DEVICE FOR A MOBILE TELEPHONE TYPE PORTABLE TERMINAL

BACKGROUND OF THE INVENTION

1. Field of the Invention

The present invention concerns mobile telephones and in particular a self-disabling device for disabling a portable terminal that has been stolen or used in an unauthorized manner.

2. Description of the Prior Art

In a GSM type mobile telephone system each user has a portable terminal or telephone which he can use to telephone any other telephone user. Each portable terminal is identified by a mobile equipment identifier number (IMEI) known to the network control station.

Each network user is supplied with a subscriber identifier module (SIM) when he takes out a subscription. He can use his portable terminal only after inserting his SIM card into his terminal. However, the SIM card is totally independent of the terminal and can be used in different terminals.

In the case of a terminal that has been stolen, the thief or someone receiving the stolen terminal can take out a subscription and obtain a SIM card and in this way obtain access to the network. For this reason the control station maintains an up-to-date database listing stolen terminals. To prevent a stolen terminal using the network, the IMEI of the terminal is requested during setting up of the session with the terminal, this identifier is checked against the database and communication with the terminal is barred if it proves to have been stolen. A procedure of this kind is time-consuming and greedy in terms of resources in that the verification procedure uses the communication channel of each terminal although very few terminals are stolen.

For this reason the main object of the invention is to provide a self-disabling device for disabling a portable terminal that is simple and effective and which does not make major use of resources assigned to the terminal.

Another object of the invention is to provide a self-disabling device for disabling a portable terminal which has been stolen in response to information contained in a short information message transmitted systematically to all terminals.

SUMMARY OF THE INVENTION

The invention consists in a self-disabling device for a portable terminal used in a mobile telephone network, said device including a register holding an identification number of said portable terminal, a buffer memory for temporarily storing short information messages transmitted by a control station of said network, one such message received containing a list of identifier numbers of terminals used fraudulently, a comparator for comparing said identifier number of said terminal with each identifier number in said list, and a circuit for disabling transmission of calls by said portable terminal in response to a positive comparison by said comparator.

The objects, subject matter and features of the present invention will be more clearly understood from a reading of the following description given with reference to the appended drawings.

DETAILED DESCRIPTION OF THE PREFERRED EMBODIMENT

Figure 1:
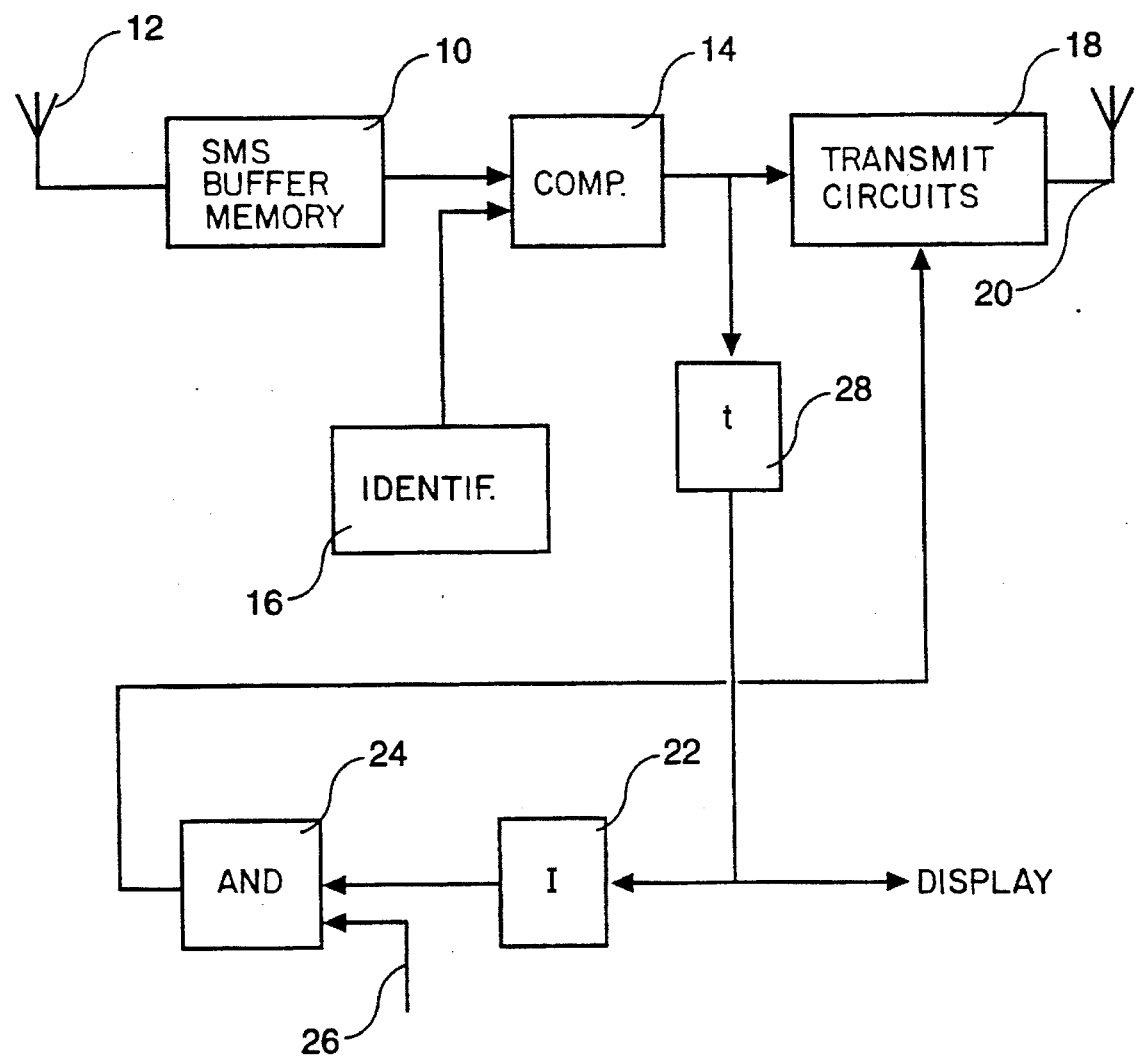
FIG. 1 is a block diagram of a preferred embodiment of the self-disabling device of the invention.

Referring to FIG. 1, the device of the invention includes a buffer memory 10 which temporarily stores short messages received via the receive antenna 12. These short messages (called SMS messages in the GSM system) are broadcast at regular intervals (for example every 30 seconds) to all the terminals in a particular area.

After receiving the list of identifiers (IMEI) of stolen terminals, usually immediately (although this is not vitally important where the invention is concerned), the comparator 14 compares the numbers in the list received in the buffer memory 10 and the identification number of the terminal which is held in a register 16.

On the other hand, if the comparison is positive, i.e. if the terminal has been stolen, a signal is passed from the output of the comparator 14 to the transmit circuits 18 so that the latter advise the control station, via the transmit antenna 20, that the terminal has been stolen.

At the same time as this information is transmitted to the control station, the output signal of the comparator 14 (usually a "high" signal equivalent to a bit at "1") is passed to a circuit for disabling the terminal comprising the inverter 22 and the AND gate 24.

If the terminal has not been stolen the output of the comparator 14 remains "low" and the signal fed to the inverter 22 is equivalent to a bit at "0", the result of which is that the output of the inverter is "high" (equivalent to a bit at "1") and the gate 24 passes the signal supplied on the line 26 which activates the transmit circuits.

If the terminal has been stolen, producing a positive output from the comparator 14, the output of the inverter 22 is then "low", i.e. equivalent to a bit at "0", which shuts the AND gate and prevents activation of the transmit circuits 18 by the signal from the line 26.

A time-delay circuit 28 is connected between the output of the comparator 14 and the inverter 22. It may be beneficial to delay disabling of the terminal, or at least of its transmit circuits, by a time t from a positive comparison, to give said transmit circuits time to transmit the information to the control station.

It may also be beneficial to advise the person using the terminal (who may not be the thief, but merely a person who has received the stolen terminal) that the terminal has been stolen and is about to be disabled. For this reason, as shown in FIG. 1, the output of the comparator can be passed to the display circuits in order to display a message on the screen with which the terminal is usually provided.

The line 26 could purely and simply be the line connecting the terminal to the battery power supply, the effect of which would be to deactivate the terminal entirely in response to a positive comparison.

Figure 2:
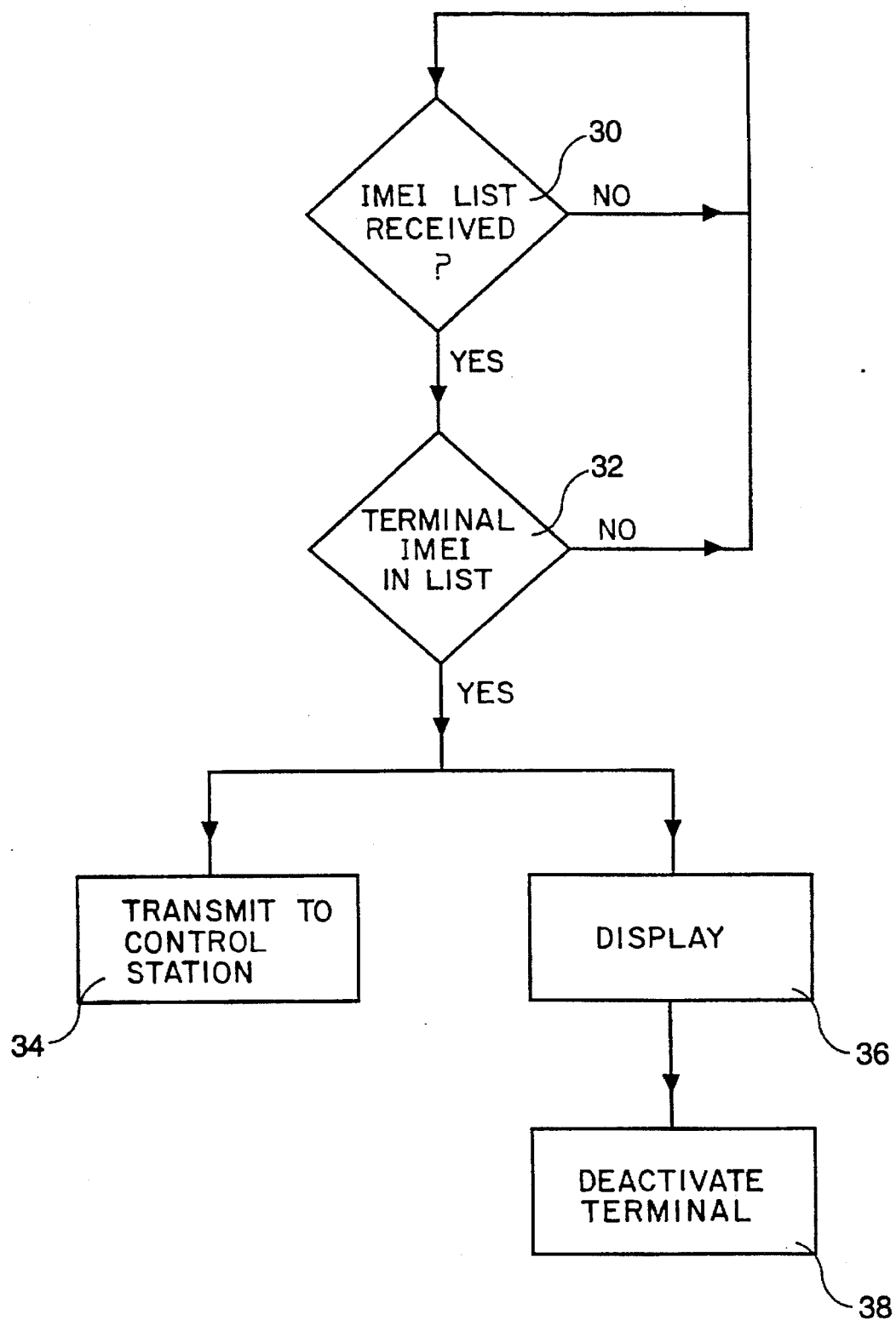
FIG. 2 is a flowchart of the self-disabling operations carried out by the device of the invention to disable the portable terminal.

FIG. 2 is a flowchart of the operations carried out by the disabling device of the invention.

Step 30 determines whether the list of stolen terminal identifier numbers (IMEI) has been received. If no, the process loops to the start. If yes, step 32 determines if the identifier of the terminal is on the list. If no, the process loops to the start. If yes, two types of operation are carried out. Step 34 transmits information to the control station indicating that the terminal has been stolen. The second type of information concerns display on the screen of the terminal of a message advising the user that the terminal has been stolen (step 36) and is about to be disabled (step 38).

It is clear that the flowchart shown in FIG. 2 can be organized in various ways without departing from the scope of the invention and that the implementation of the disabling device as described with reference to FIG. 1 is merely one of many possible implementations.

There is claimed:

1. In a portable terminal used in a mobile telephone network, a self-disabling device including a register holding an identification number of said portable terminal, a buffer memory for temporarily storing short information messages transmitted by a control station of said network, one such message received containing a list of identifier numbers of terminals used fraudulently, a comparator for comparing said identifier number of said terminal with each identifier number in said list, and a circuit for disabling transmission of calls by said portable terminal in response to a positive comparison by said comparator.

2. Self-disabling device according to claim 1 wherein said disabling circuit includes an AND gate having two inputs a first of which is connected to a line for activating transmission of calls by said terminal and the second of which is connected to the output of said comparator via an inverter so that transmission of calls by said terminal is disabled if the output of said comparator is positive because the identifier number of said terminal is in said list of identifier numbers.

3. Self-disabling device according to claim 2 wherein the output of said comparator activates display of a warning message to the person using said terminal.

4. Self-disabling device according to claim 1 wherein the output of said comparator activates transmission of a warning message to said control station by transmit circuits of said terminal to advise said control station that said portable terminal is being used fraudulently.

5. Self-disabling device according to claim 4 further including a time-delay circuit between the output of said comparator and the input of said disabling circuit so that said terminal is able to transmit said warning message before the transmit circuits of said terminal are disabled in response to a positive comparison.

6. Self-disabling device according to claim 1 wherein said disabling circuit deactivates the power supply of said terminal in response to a positive comparison by said comparator.

7. Self-disabling device according to claim 1 used in a GSM type mobile telephone system.

8. Self-disabling method for disabling a portable terminal used in a mobile telephone network, said method comprising the following steps, performed in said portable terminal: detecting reception of a message containing a list of terminals used fraudulently, comparing identifier numbers from said list with an identifier number of said terminal, and disabling transmission of information by said terminal in response to a positive comparison.

9. Method according to claim 8 further comprising display of a message on a screen of said terminal in response to a positive comparison.

10. Method according to claim 8 further comprising transmission of a warning message to a control station of said network in response to a positive comparison.

* * * * *